Nov. 16, 1965  F. W. TATE, JR  3,217,745
HYDRAULIC FLUID CONTROL OPERATING VALVE
Filed June 10, 1963  2 Sheets-Sheet 1

Fred W. Tate, Jr.
INVENTOR.

BY Clarence A. O'Brien
and Harvey B. Jacobson
Attorneys

Nov. 16, 1965    F. W. TATE, JR    3,217,745
HYDRAULIC FLUID CONTROL OPERATING VALVE
Filed June 10, 1963    2 Sheets-Sheet 2
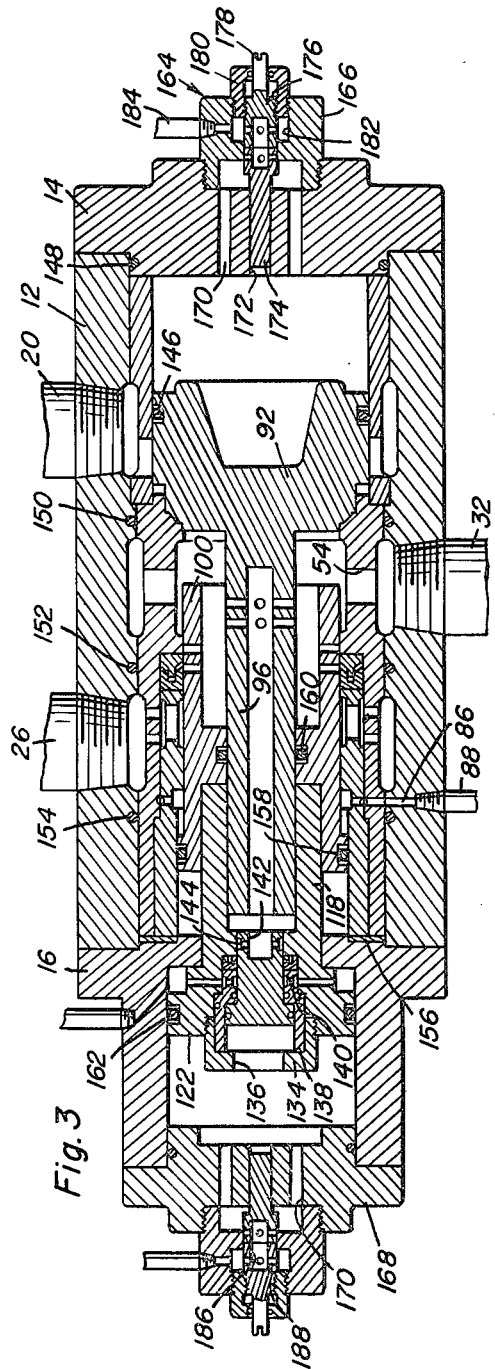
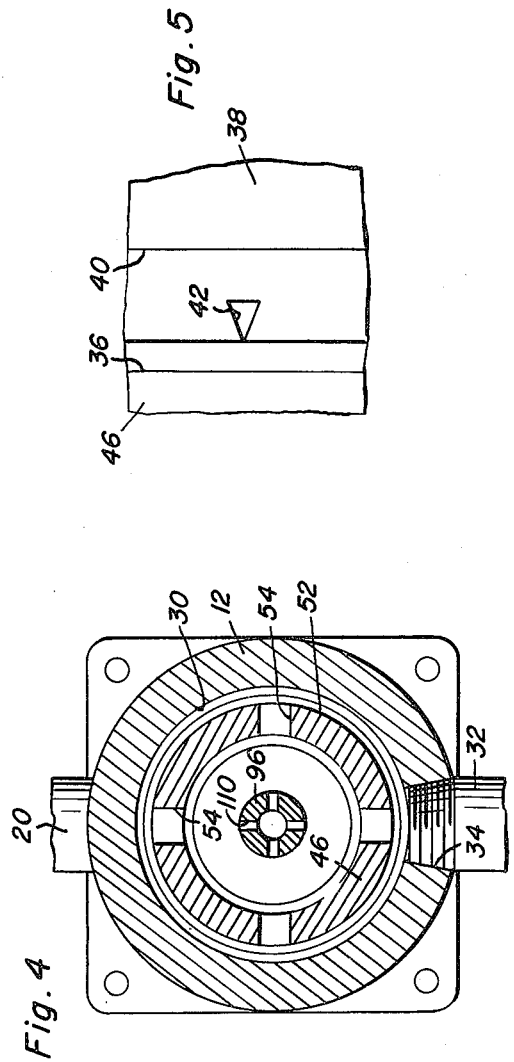
Fred W. Tate, Jr.
INVENTOR.

United States Patent Office 3,217,745
Patented Nov. 16, 1965

3,217,745
HYDRAULIC FLUID CONTROL OPERATING
VALVE
Fred W. Tate, Jr., 1177 Northern Parkway,
Baltimore 12, Md.
Filed June 10, 1963, Ser. No. 286,681
6 Claims. (Cl. 137—596.18)

The present invention generally relates to a novel and improved operating valve especially adapted for use on heavy equipment operated by hydraulic pressure and more particularly, the present invention relates to a hydraulic fluid control operating valve for such use.

An object of the present invention is to provide a hydraulic fluid control operating valve in the form of a three or four-way valve in which the spindle is constructed of three component parts which are movable relative to each other and which incorporates a pressure release therein to eliminate shock without drift of the equipment being operated.

While there are three pieces geneally constituting the spindle, one of these pieces is provided for the aforementioned pressure release with the operating components of the spindle actually involving two pieces including a solid portion in generally the form of a piston and a sleeve slidable on the piston which enables the two components to be moved into a central mid-position.

Another object of the present invention is to provide a valve construction in accordance with the preceding objects in which the outside periphery of the sleeve is under a constant line pressure which returns the sleeve to the exhaust position when the hydraulic fluid control operating valve is controlled so that it goes into the exhaust position.

Still another object of the present invention is to provide a valve in accordance with the preceding objects having a generally triangular inlet aperture or hole for enabling the flow of fluid to be cut off gradually when the piston portion of the spindle moves to inlet closing position.

Still anther object of the present invention is to provide a valve construction constructed of a minimum number of parts and incorporating a shoulder or step adjacent the exhaust port for supporting the packing pedestal thereby eliminating any pressure from either the pedestal or other packing thereby extending the life expectancy of such packing and seals.

Still another feature of the present invention is to provide a hydraulic fluid control operating valve which is foolproof in operation, long lasting, safe in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a sectional view similar to FIGURES 1 and 2 but illustrating the spindle in the central mid-position;

FIGURE 4 is a transverse, sectional view taken substantially upon a plane passing along section line 4—4 of FIGURE 1 illustrating the construction of the the valve body; and FIGURE 5 is a detail sectional view taken substantially upon a plane passing along section line 5—5 of FIGURE 1 illustrating the triangular configuration of the inlet port.

Figure 1:
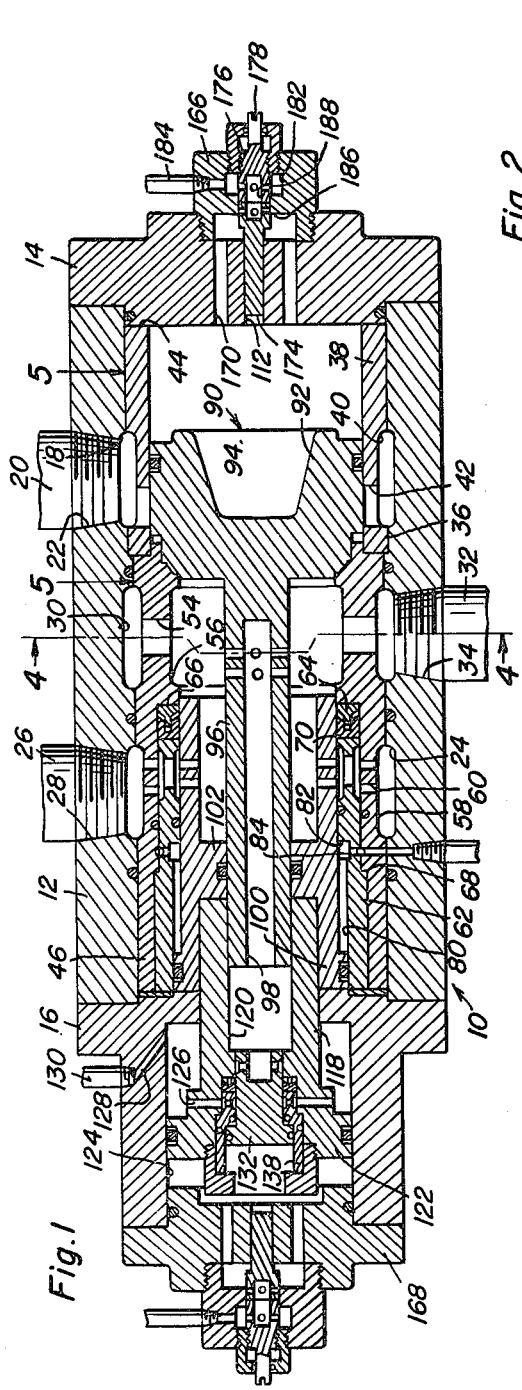
FIGURE 1 is a longitudinal sectional view of the hydraulic fluid control operating valve of the present invention with the valve spindle in the exhaust position.

Referring now specifically to the drawings, the numeral 10 generally designates the hydraulic fluid control operating valve of the present invention which includes an elongated cylindrical body 12 having end caps 14 and 16 attached thereto by suitable cap screws or the like. The end caps 14 and 16 are preferably square or rectangular in configuration for ease of attachment of the valve 10 to any desired supporting structure. Adjacent one end of the valve body 12 is an annular groove 18 having communication with a hydraulic fluid pressure inlet pipe, tube or the like 20 by a suitable screw-threaded connection 22. Adjacent the other end of the valve body 12, there is provided an annular groove 24 having communication with an exhaust pipe or tube 26 by a suitable screw-threaded connection 28. At the center portion of the valve body 12, there is provided an annular internal groove 30 communicated with a hydraulic pipe or conduit 32 extending to the equipment being operated with the connection being a suitable screw-threaded connection 34 or the like. Thus, there are provided three annular grooves 18, 24 and 30 in the interior surface of the valve body 12 communicating with the inlet, exhaust and equipment being controlled respectively for enabling the valve 10 to control operation of the equipment.

Figure 2:
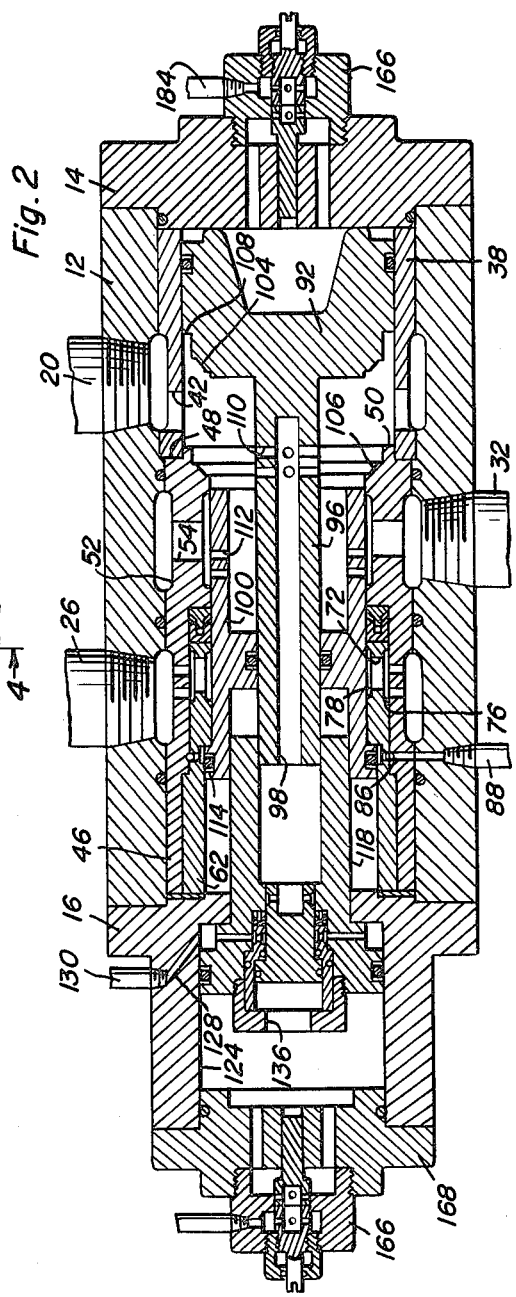
FIGURE 2 is a sectional view similar to FIGURE 1 but with the spindle in power or working position.

The radially inner surface of the valve body 12 axially inwardly of the groove 18 is provided with a shoulder or step 36 receiving a cylindrical bushing 38 therein having an annular groove 40 in the external periphery thereof in matching relationship to the groove 18. Communicating with the groove 40 is a plurality of inlet ports or apertures 42. As illustrated in FIGURE 5, such ports are of triangular configuration with the apices thereof disposed toward the remote end of the valve body 12 or toward the end cap 16. For retaining the bushing 38 fixedly against the shoulder formed by the step 36, the end cap 14 is provided with a cylindrical projection 44 which telescopes into the end of the valve body 12 and abuts the outer end of the bushing 38 when the end cap 14 is secured in place. Also, the thickness of the bushing 38 is greater than the depth of the shoulder or step 36 thereby forming an internal shoulder for engagement with an elongated bushing 46 that is inserted from the opposite end of the valve body 12 into abutting engagement with the axially inner end of the bushing 38. The axially inner end of the bushing 46 is provided with an annular shoulder 48 engaging the end of the bushing 38 and includes an axial projecting cylindrical portion 50 which telescopes slightly into the axially inner end of the bushing 38 as illustrated in FIGURES 1–3.

The external surface of the bushing 46 is provided with a peripheral groove 52 in alignment with the groove 30 and is provided with a plurality of radial ports 54 communicating the interior of the bushing 46 with the exterior groves 52 and 30. The interior surface of the bushing 46 is also provided with an annular groove 56 for assuring communication of all of the ports with each other for a purpose described hereinafter. The external surface of the bushing 46 is also provided with a peripheral groove 58 communicating with and aligned with the groove 24 for communicating the exhaust conduit 26 with a plurality of radially extending ports 60 formed in the bushing 46.

Disposed within the elongated bushing 46 is a radially inner cylindrical bushing 62 which serves as a packing pedestal and retains a packing 64 against a shoulder 66 formed in the bushing 46 between the ports 54 and 60. Axially outwardly of the ports 60, the bushing 46 is provided with a shoulder 68 which abuttingly engages a corresponding shoulder on the inner bushing or pedestal 62 for limiting axial inward movement of the pedestal 62 thereby preventing any excessive pressure being exerted on the U-shaped packing 70 or pedestal 64 thereby extending the effective operating life of the packing and pedestal. Also, the inner bushing 62 is provided with radial ports 72 communicating with an external groove 76 and an internal groove 78 formed in the inner bushing 62. Also, the internal surface of the inner bushing 62 is provided with a counterbored area 80 defining a shoulder 82 with there being a groove 84 at the shoulder 82 which communicates with a passageway 86 that extends to and through the exterior of the valve body for connection with a static line pressure tube or pipe 88 for maintaining a constant line pressure in the space defined by the counterbored portion 80 for a purpose described hereinafter.

Slidably disposed within the bushings 38, 46 and 62, is a spindle assembly generally designated by numeral 90 and including a piston 92 having a recess 94 in the head thereof together with an elongated piston rod 96 having a hollow interior bore 98 rigid with the piston head 92. The other component part of the spindle includes a generally cylindrical sleeve 100 having a radially inwardly extending generally centrally disposed flange 102 slidingly receiving the piston rod 96 and also the sleeve 100 is slidably disposed within the interior of the bushings 46 and 62 with the periphery of the sleeve engaging the surfaces of the interior of the bushings 46 and 62.

The piston 92 is in the form of a valve member and is provided with an inclined seat 104 on the axially inner end thereof for sealing engagement with a complementary stationary seat 106 on the axially inner end of the bushing 46. Also, the piston 92 includes a shoulder 108 for registry with the end of the cylindrical projection 50 on the bushing 46 whereby the axially inner end of the bushing 46 generally conforms with the axially inner end of the piston 92 to form an effective valve seat when engaged therewith with the shoulder 108 normally being spaced from the end of the projection 50 as illustrated in FIGURE 1.

The piston rod 96 is provided with a plurality of radial bores 110 therein communicating the exterior of the piston rod with the longitudinal bore 98 therein. Also, the portion of the slidable sleeve 100 disposed axially inwardly of the flange 102 is provided with a plurality of radial bores 112 therein for communicating the exterior of the sleeve 100 with the interior thereof.

The axially outer end of the sleeve 100 is provided with an annular radially outwardly projecting flange 114 which moves in the space defined by the counterbore 80 from a position engaging the shoulder 82 to a posititon whereby the axially outer end of the sleeve is disposed against the end cap 16.

The axially outer end portion of the sleeve 100 receives a cylindical member 118 slidably therein which also has an internal bore 120 receiving the end of the piston rod 96. The axially outer end of the cylindrical member 118 is in the form of a piston 122 slidable in the interior of cylinder 124 formed as a part of the end cap 16. Radial vent ports 126 are provided in the cylindrical member 118 for communicating the interior thereof with the exterior. The axially inner end of the cylinder 124 is provided with a vent port 128 which may be communicated with a suitable tube 130 or the like. A valve type plunger 132 is movably mounted within the member 118 for controlling communication from the interior bore 120 of the member 118 to the vent ports 126 and 128.

As clearly illustrated, the piston 122 is provided with a screw-threaded cap 134 having an enlarged opening 136 therein. The cap 134 retains a cylindrical adapter 138 in position which has apertures 140 therein communicating with the ports 126. The axial inner end of the plunger 132 is provided with a recess 142 having radial apertures 144 communicated therewith for selective alignment with the ports or apertures 140 when the plunger 132 is moved axially outwardly to its limit of movement as defined by the retaining cap 134. The enlarged opening 136 enables the head of the plunger 132 to be exposed to hydraulic line pressure to normally retain the plunger 132 in closed position. However, upon an increase in pressure against the axially inner end of the plunger 132 sufficient to overcome the static line pressure against the axially outer end of the plunger, the plunger will momentarily move axially outwardly thus enabling discharge of the high pressure for eliminating any built-up pressure or shock when the valve is pushed to a mid-position without allowing any drift of the spindle structure.

Various seals may be provided where deemed necessary including an O-ring seal 146 in the external periphery of the piston 92. Also, an O-ring seal 148 is provided for the end cap 14 where the shoulder 44 telescopes into the end of the body 12. Also, O-ring seals 150, 152 and 154 are provided in the inner surface of the body 12 on opposite sides of the grooves formed therein. Also, a sealing gasket 156 is provided between the ends of the bushings 46 and 62 and the end cap 16 thus sealing this area. Also, an O-ring seal 158 is provided in the projecting flange 114 on the sleeve 100 and an O-ring seal 160 is provided in the interior surface of the flange 102 on the sleeve. Also, suitable seals are provided between the adapter 138 and the cylindrical member 118 and between the plunger 132 and the adapter 138 and an O-ring seal 162 is provided between the piston 122 and the cylinder 124.

Each of the end caps 14 and 16 has a pilot control apparatus 164 which includes a screw-threaded adapter 166 threaded into the end cap 14 and a closure cap 168 forming a closure for the cylinder 124 in the end cap 16. The closure cap or end cap 14 and the closure cap 168 each has a plurality of longitudinal bores 170 extending therethrough and a central bore 172 slidably receiving an extension 174 on a control piston 176 having a slot 178 on the axially outer end thereof. The piston 176 is screw-threaded into a cap 180 threaded into a counterbore 182 in the cap 166. The counterbore 182 is provided with a hydraulic pressure pipe 184 for supplying control fluid to the counterbore 182. This piston 176 is provided with a longitudinal hollow central portion 186 having a plurality of longitudinally spaced radial ports 188 therein for communicating the counterbore space 182 with the bores 170 by virtue of one set of ports 188 communicating with the annular passage 182 and the other set communicating with the axially inner end of the retaining cap or nut 166. Thus, by employing a screwdriver in the slot 178 and rotating the piston 176, the flow rate of control fluid into and out of the chamber defined by the bushing 38 and piston 92 in one instance and the cylinder 124 and the piston 122 in the other instances may be adjusted or throttled as desired for controlling the rate of movement of the component parts of the spindle.

FIGURE 1 illustrates the device in the exhaust position whereby the piston 92 closes off the inlet ports 42 and rests against the seat 106 thus forming a closure for the intake end of the valve. This communicates the power outlet pipe 32 to the exhaust 26 by virtue of the annular grooves 30 and 52, ports 54, ports 112, 72, 60 and grooves 58 and 24.

FIGURE 2 illustrates the piston in the powered or working position in which the piston 92 is moved to the right and the intake ports are open. Also, the sleeve 100 has been moved to the right for closing the ports 72 thus communicating the intake 20 with the power supply pipe 32. Movement of the sleeve 100 closes off the exhaust port.

FIGURE 3 illustrates the spindle assembly in a mid-position in which the piston 92 is closed and in which the sleeve 100 is still in the exhaust port closing position thereby preventing flow of hydraulic fluid back from the supply pipe 32.

As illustrated, the outside diameter of the sleeve 100 is constantly under pressure which gives a push to the sleeve when moving into the exhaust position or otherwise, the sleeve is constantly urged towards the exhaust position by virtue of the annular flange 114 on the axially outer end thereof riding in the undercut portion of the inner bushing 62. Also, the inlet bushing 38 has the triangular holes 42 therein for allowing the flow to be cut off gradually. The valve body may be machined from a billet or forged with flanges bolted on for larger sizes as desired. The device is machined with a step at the exhaust port to support the packing material which is done to eliminate any pressure from either the pedestal or other packings against the U-packing which causes a short life of this packing. In the present invention, the only pressure against the U-packing is the normal pressure for sealing purposes. Further, the construction of the spindle of the piston section and the sleeve section enables the spindle section to be pushed into a mid-position as illustrated in FIGURE 3. The sleeve end of the valve has a cylinder associated therewith together with a pusher piston to push the sleeve into operating position. This piston has a built-in pressure release to eliminate any built-up pressure or shock when the valve is pushed to mid-position. For compact construction, the spindle is so designed that the piston rod or stem connected with the piston 92 slides through the sleeve section and partially into the sleeve pusher piston assembly thereby reducing the over-all length of the assembly. The bores in the stem section of the piston 92 will exhaust any built-up pressure or shock to the plunger piston thus enabling this built-up pressure to go through this hole to the bleed or relief aperture. The pressure applied to the back of the pusher piston is normal line pressure which will hold the relief plunger or valve normally in closed position. The plunger having a larger diameter at this outer end will normally be closed and when the built-up pressure or shock from the cylinder outlet in the main body of the valve pushes through the hole in the stem at the same diameter of the relief plunger or valve, the plunger will be pushed to the open position so that the holes therein line up thus relieving the built-up pressure in the main valve outlet instantly to the normal line pressure of the operations. After the built-up pressure has been released which is substantially instantaneously, the larger diameter of the relief plunger piston would then push the relief assembly back to normal position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A valve construction comprising a valve body defining an elongated valve chamber, a valve spindle assembly reciprocably disposed within said chamber, said assembly including a piston valve member and a sleeve valve member, said piston valve member and sleeve valve member having slidably interrelated components for movement in relation to each other, and a pusher piston assembly slidably interrelated with said sleeve valve member and engageable therewith for moving the sleeve valve member in relation to the piston valve member, said valve chamber including an inlet port adjacent one end, an exhaust port adjacent the other end and a centrally disposed power outlet port, said piston valve member selectively opening and closing the inlet port, said sleeve valve member selectively opening and closing the exhaust port, said valve spindle assembly being movable to an exhaust position, a power position and a hold mid-position, said pusher piston assembly including means for venting pressure build-up when the valve spindle assembly is moved to a hold mid-position thereby enabling elimination of the built-up pressure without drift of the spindle assembly.

2. The structure as defined in claim 1 wherein said piston valve member and pusher piston assembly are communicated with line pressure for operating the valve spindle assembly.

3. The structure as defined in claim 2 wherein said sleeve valve member includes a peripheral radially outwardly projecting flange on one end thereof, said valve body having a radially inwardly extending peripheral flange in the chamber, and a static pressure line communicating with the space between the flange on the sleeve valve member and the flange on the valve body for returning the sleeve valve member to its exhaust position.

4. The structure as defined in claim 3 wherein the inlet port closed by the piston valve member is of triangular configuration having an apex parallel to the axis of movement of the piston type valve member whereby the piston will gradually close the inlet port when moving from the apex toward the base of the port.

5. The structure as defined in claim 4 wherein said venting means in the pusher piston assembly includes a plunger-type valve therein, means communicating the working fluid pressure with the plunger-type valve in the pusher piston assembly whereby the control pressure on the pusher piston assembly may be overcome and the plunger-type valve opened for instantaneous discharge of built-up fluid pressure, said valve body including a vent for such built-up pressure.

6. An operating valve for operating relatively large heavy duty hydraulic equipment comprising a valve body having a valve chamber therein, said valve chamber including a pressure inlet and a pressure exhaust orientated in spaced longitudinal relation, said valve chamber also including a pressure outlet port communicated with equipment being operated, a valve spindle assembly disposed in the valve chamber for reciprocation therein, said assembly including a piston valve member reciprocating in relation to the inlet port for selectively opening and closing the inlet port, a sleeve valve reciprocally mounted in the valve chamber and reciprocal in relation to the piston valve for selectively opening and closing the outlet port to the hydraulic equipment in selectively opening and closing the exhaust port, a pusher piston engaged with the sleeve valve, means communicating the remote ends of the piston valve and the pusher piston with line pressure, means on said sleeve valve member for receiving line pressure for urging the sleeve valve toward its exhaust position, said pusher piston including a plunger valve therein communicating with the working pressure side of the spindle valve assembly whereby the line pressure may be overcome for releasing built-up pressure in the working chamber of the valve.

References Cited by the Examiner
UNITED STATES PATENTS

| 2,526,361 | 10/1950 | Johnson | 137—625.6 X |
| 2,736,170 | 2/1956 | Huse | 137—625.69 X |
| 2,910,050 | 10/1959 | Dotter et al. | 137—625.68 X |
| 2,920,650 | 1/1960 | Moog | 137—625.69 |

M. CARY NELSON, *Primary Examiner.*

HENRY T. KLINKSIEK, *Examiner.*